No. 856,911. PATENTED JUNE 11, 1907.
H. S. ROBERTS.
VALVE.
APPLICATION FILED JULY 11, 1905.

2 SHEETS—SHEET 1.

No. 856,911. PATENTED JUNE 11, 1907.
H. S. ROBERTS.
VALVE.
APPLICATION FILED JULY 11, 1905.

UNITED STATES PATENT OFFICE.

HOWARD S. ROBERTS, OF PHILADELPHIA, PENNSYLVANIA.

VALVE.

No. 856,911.  Specification of Letters Patent.  Patented June 11, 1907.

Application filed July 11, 1905. Serial No. 269,197.

*To all whom it may concern:*

Be it known that I, HOWARD S. ROBERTS, a citizen of the United States, residing in the city and county of Philadelphia, State of Pennsylvania, have invented a new and useful Valve, of which the following is a specification.

My invention consists of a novel construction of an intersection valve in which the valve chest is formed by a number of sectional casings, any one of which may be readily and quickly removed when it is desired to change one of the branches or to insert a branch of a different diameter.

It further consists of a novel and simplified construction of valve operating mechanism.

It further consists of novel features of construction all as will be hereinafter fully set forth.

Figure 1:
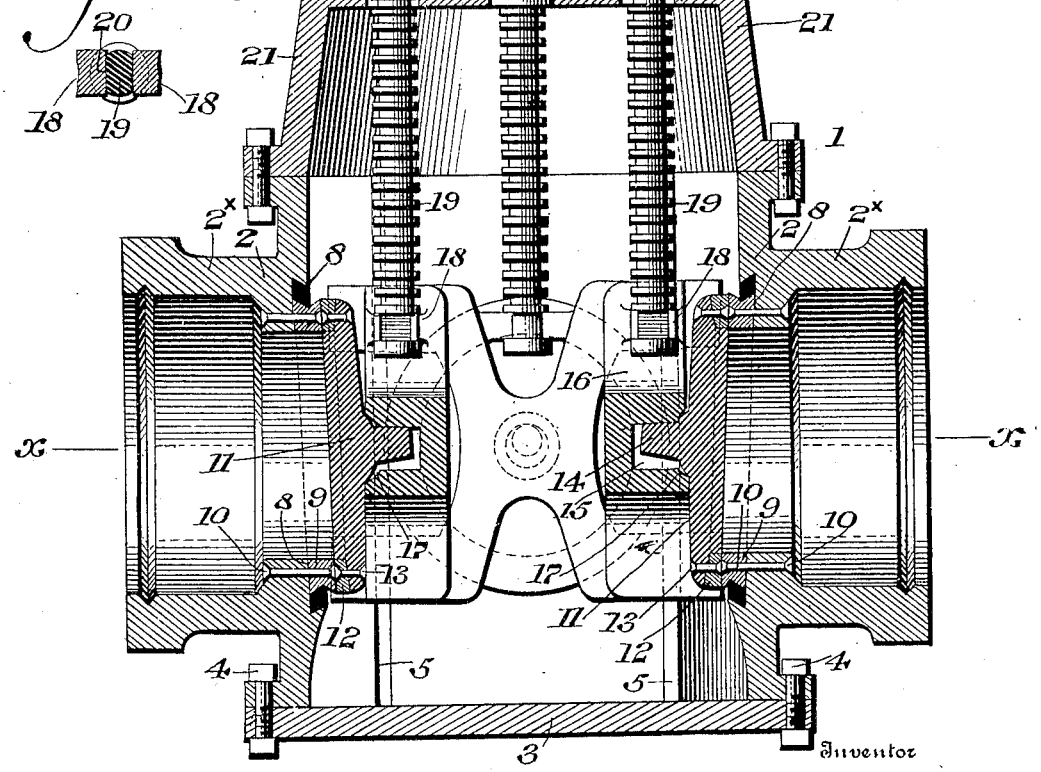
Figure 2:
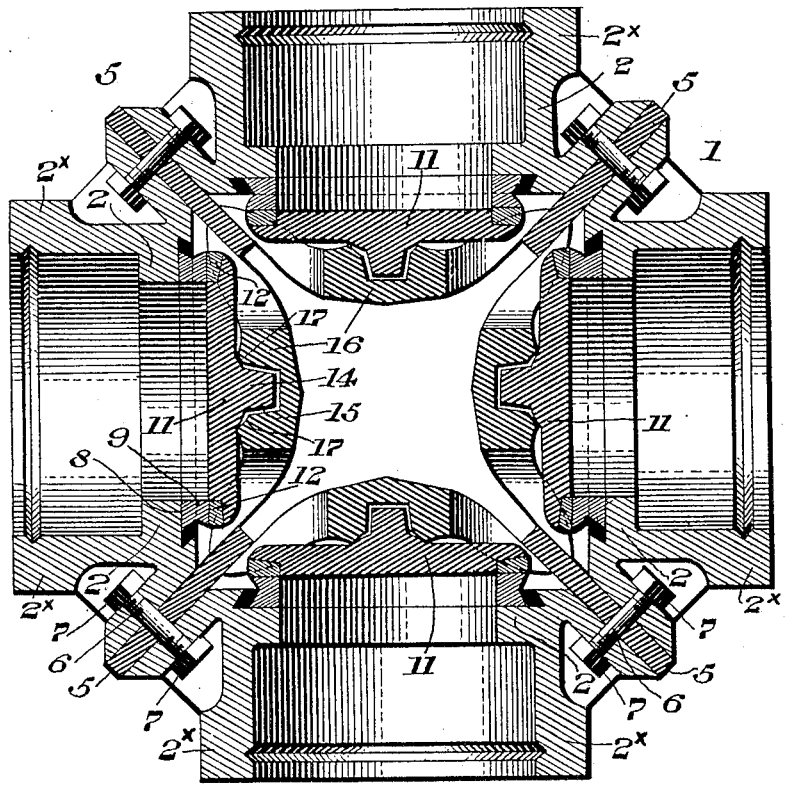

Figure 1 represents a sectional elevation of a valve embodying my invention. Fig. 2 represents a sectional plan view taken on line $x$—$x$ Fig. 1. Fig. 3 represents a sectional view of a portion of the device showing the manner of securing the screw stem to the gate support.

Similar numerals of reference indicate corresponding parts in the figures.

Referring to the drawings. 1 designates a valve chest comprising a plurality of interchangeable sections 2 having branches $2^\times$, said sections being suitably secured to a base plate 3 by means of bolts or equivalent devices 4.

5 designates guides interposed between the sections 2 and held in assembled position in the present case by means of bolts 6 having nuts 7 therefor.

8 designates a recess in the sections in which is secured a bearing plate or seat 9 by means of rivets or equivalent devices 10. The valve seat 9 does not completely fill the recess 8, there being a space between the outer wall of said seat and the contiguous wall of the recess, said space being filled with suitable calking material such as lead or the like and the inner walls of the valve seats incline from top to bottom.

11 designates gates or valves having a recess in their outer face near their outer periphery in which is secured the bearing surfaces 12 by suitable means such as screws or rivets 13.

14 designates a lug preferably in the form of a ball and pin and extending inwardly from the inner wall of the gate 11 and adapted to be retained in the socket 15 of the gate support 16. As seen in Fig. 1, the socket 15 is beveled or recessed at 17 so that the ball portion of the lug 14 may have a bearing therein. The pin portion of the lug 14 tapers slightly inwardly, the purpose of which will hereinafter appear.

18 designates lugs extending from the support 16 between which is held one end of a screw stem 19 which is faced off or recessed on opposite sides as seen at 20 so that the lugs retain the screw in a non-rotatable position with respect to said gate support 16.

21 designates a bonnet suitably secured to the sections 2 and being provided with stuffing boxes 22 there being a separate box for each stem 19.

23 designates sleeves provided with flanges 24 at their lower end, said sleeves having a bearing in followers 25 which are adjustably secured to said bonnet by means of cap screws 26, it being understood that suitable packing and a washer is inserted between the annular flange 24 and the lower end of the follower 25.

The screw stems 19 are adapted to pass through the bottom of the stuffing boxes 22 and into the chamber 27 of the sleeves 23, said stems having threaded engagement with the lower end of said sleeves so that when the latter are rotated the stems will be elevated or lowered depending upon the rotation of the said sleeves.

28 designates the top of the sleeves 23 which are squared or otherwise adapted to receive a tool by means of which they are actuated.

The operation is as follows:—The parts being in the position seen in Fig. 1, the sleeves or any one of them may be turned whereby the screw stems 19 engaging with the sleeves 23 are elevated and with them the supports carrying the gates 11. The gates are so balanced with respect to the supports 16 that the tops of the gates will move slightly inwardly owing to the ball and socket joint formed by the ball portion of the lug 14 and the recess 17 with which it engages while the underside of the tapering portion of the lug 14 engages the contiguous portion of the socket 15. When the sleeve is rotated in the opposite direction the gate support will be lowered and as the gate contacts with the inclined face of the valve seats the gate accommodates itself thereto and the top side of the pin portion of the lug 14 will engage the contiguous side of the socket 15 and thus give a stronger leverage and the bearing surfaces of the gates and valve seats will be forced tightly against each other. I wish to call especial attention both to the manner in which the valve is carried and to the actuating mechanism therefor, since I have found in practice that the valve does not stick, is very easily actuated and that a tight joint is always produced. The gate supports 16 are always guided in their movement by means of the guides 5 and as this movement is substantially vertical it will be noted that the gates 11 form a ground joint with the valve seats owing to the manner in which they are carried by the gate supports 16. The tapering portion of the pin engaging the wall of the socket 15 will give a much more powerful leverage than if I employ simply a ball and socket joint while at the same time the gate will be permitted to rock or turn as desired so that the bearing surfaces will wear very evenly. It is to be noted that the screw stems are non-rotatably secured to the gate supports and that the stems screw into the sleeves 23 so that under ordinary circumstances a large portion of the screw stems is out of contact with the liquid which is being controlled and it is apparent that the ordinary corrosive action of the fluid on said stems will be reduced to a minimum.

Although I have shown herein a valve chest comprising four separate sections it is evident that the number of sections employed may be varied according to the requirements and that anyone of the sections may be removed without destroying the remainder and other sections may be quickly and easily inserted thus permitting the insertion of a section having a branch of different size from the others if desired.

It will be evident that various changes may be made by those skilled in the art which may come within the scope of my invention and I do not therefore desire to be limited in every instance to the exact construction herein shown and described.

Having thus described my invention, what I claim as new and desire to secure by Letters Patent, is:—

1. A valve chest comprising a plurality of interchangeable sections, branches therefor, valve seats having inclined walls carried by said sections, gate supports independent of said sections and adapted to be properly raised and lowered, guides for said supports, gates movably mounted on said supports in order to properly engage with said valve seats and means for causing said gates to tilt and be forced out of their normal plane as the supports are moved.

2. A valve chest comprising a plurality of interchangeable sections, branches therefor, valve seats having inclined walls carried by said sections, guides projecting inwardly and secured to said chest, gate supports independent of said sections and adapted to be properly raised and lowered and guided by said guides, gates mounted for rocking movement on said supports in order to properly engage with said valve seats, and means for causing said gates to tilt and be forced out of their normal plane as the supports are moved.

3. A valve chest comprising a plurality of interchangeable sections having recesses, branches therefor, valve seats having inclined inner walls secured in the recesses of said sections, guides projecting inwardly and secured to said chest between said branches, gate supports independent of said sections and movable between said guides in a vertical direction thereon, gates carried by said supports and mounted for rocking movement thereon and bearing faces secured to said gates and adapted to engage said valve seats.

4. A valve chest comprising a plurality of separate interchangeable sections, branches suitably connected therewith, valve seats having inclined inner walls secured to each of said sections, a series of valves for the latter, bearings secured thereto and adapted to engage said seats, lugs projecting from said valves, gate supports independent of the gates and their stems, sockets therein adapted to receive said lugs, guides for said supports and by which the same are positively guided vertically, screw stems mounted on said supports and means for raising and lowering said stems.

5. A valve chest comprising a plurality of separate interchangeable sections, branches suitably connected therewith, valve seats having inclined inner walls secured to each of said sections, a series of valves for the latter, lugs projecting from said valve, gate supports, sockets therein adapted to receive said lugs, guides for said supports for guiding the same vertically, screw stems mounted on said supports and means for raising and lowering said stems, and rocking the valves while the supports are positively guided in a vertical direction.

6. A valve chest comprising separate interchangeable sections, branches suitably connected therewith, valve seats having inclined walls secured to said sections, valves adapted to engage said seats, a lug having a ball and pin extending from each of said valves, a valve support independent of said sections and positively guided in a vertical direction, a socket therein adapted to receive said lug, screw stems secured to said valves, and sleeves in which said stems have threaded engagement and whereby said valves are actuated.

7. A valve chest comprising interchangeable sections, branches connected therewith of different diameters, valve seats secured to said sections, gate valves for said sections, bearing faces secured thereto adapted to coact with said seats, balls on said gate valves, gate supports independent of said sections and positively guided in a vertical direction and in which said balls have bearings, pins extending from said balls adapted to increase the leverage, stems secured to said supports, and sleeves adapted to engage said stems and actuate said valves.

8. A base, a plurality of interchangeable sections secured to said base and having branches, guides between said sections and extended inwardly therefrom, seats secured to said sections, gates co-operating with said seats, gate supports independent of the gates, means for guiding said supports vertically, a ball and pin and socket connection between each gate and support, and means non-rotatably connected to the supports for raising and lowering the same together with the gates and automatically rocking the latter.

HOWARD S. ROBERTS.

Witnesses:
C. D. McVay,
F. A. Newton.